United States Patent [19]

Rosheim

[11] Patent Number: 5,036,724

[45] Date of Patent: Aug. 6, 1991

[54] ROBOT WRIST

[76] Inventor: Mark E. Rosheim, 1565 St. Paul Ave., St. Paul, Minn. 55116

[21] Appl. No.: 499,280

[22] PCT Filed: Nov. 30, 1987

[86] PCT No.: PCT/US87/03152

§ 371 Date: May 24, 1990

§ 102(e) Date: May 24, 1990

[51] Int. Cl.[5] ....................... B25J 17/02; G05G 11/00
[52] U.S. Cl. ........................................ 74/479; 901/29
[58] Field of Search .......................... 74/479; 414/735; 901/28, 29

[56] References Cited

U.S. PATENT DOCUMENTS

| | | | |
|---|---|---|---|
| 3,405,406 | 10/1968 | Vykukal | 2/2.1 |
| 3,631,737 | 1/1972 | Wells | 74/469 |
| 3,739,923 | 6/1973 | Totsuka | |
| 3,784,031 | 1/1974 | Niitu et al. | |
| 3,912,172 | 10/1975 | Bolner | 239/265.3 |
| 4,009,644 | 3/1977 | Higuchi et al. | 92/125 |
| 4,046,262 | 9/1977 | Vykukal et al. | |
| 4,068,536 | 1/1978 | Stackhouse | 74/417 |
| 4,107,948 | 8/1978 | Molaug | |
| 4,194,437 | 3/1980 | Rosheim | 92/120 |
| 4,296,681 | 10/1981 | Rosheim | 92/122 |
| 4,628,765 | 12/1986 | Dien et al. | 74/479 X |
| 4,671,732 | 6/1987 | Gorman | 414/735 |
| 4,686,866 | 8/1987 | Rosheim | 74/479 |
| 4,723,460 | 2/1988 | Rosheim | 74/479 |
| 4,729,253 | 3/1988 | Rosheim | 74/479 |
| 4,744,264 | 5/1988 | Milenkovic | 74/479 |
| 4,907,937 | 3/1990 | Milenkovic | 901/28 X |

FOREIGN PATENT DOCUMENTS 2752236 7/1980 Fed. Rep. of Germany.

OTHER PUBLICATIONS

"A New Pitch-Yaw-Roll Mechanical Robot Wrist Actuator", Rosheim, *Society of Manufacturing Engineers*, pp. 15-20 to 15-40, vol. 2, 6/85.

Grafstein et al, "Pictorial Handbook of Technical Devices", *Chemical Publishing Co., Inc.*, (1971), pp. 16/17.

Rosheim, "Robot Wrist Actuators", *Robotic Age*, (Nov./Dec. 1982), pp. 15-22.

*Primary Examiner*—Rodney H. Bonck
*Attorney, Agent, or Firm*—Kinney & Lange

[57] ABSTRACT

A drive mechanism (62) for driving a mechanical joint (10) that includes first and second gimbal assemblies (14, 16) rotatably mounted within the interior of a support (18) and includes a decoupling mechanism (70, 72) in slidable engagement with the support (18) for effecting movement of the joint (10) in a compound yaw and pitch motion includes a yaw drive member (66) having a gear surface (82) in engagement with a drive shaft (84) having a beveled gear end portion (80) arranged to engage the gear surface (82). A pitch drive member (68) includes a gear surface (78) in engagement with a bevel gear end portion (76) of a second drive shaft (74). Both yaw and pitch drive members (66, 68) are pivotally connected to the decoupling mechanism (70, 72).

10 Claims, 7 Drawing Sheets

ROBOT WRIST

BACKGROUND OF THE INVENTION

1. Field of the Invention

The present invention relates to mechanical joints and robot wrists, and in particular, it relates to robot wrists capable of compound pitch/yaw motion with continuous roll rotation.

2. Description of the Prior Art

A number of robot wrist designs and drive mechanisms have been developed in trying to achieve a wrist having dexterity equal to the human wrist. An ideal wrist should have 180° of singularity-free pitch/yaw motion with continuous roll rotation. A brief summary of some of the prior art wrists is given below.

A rotary actuator mechanism is described in the Higuchi et al U.S. Pat. No. 4,009,644. The rotary actuator of the Higuchi et al Patent is not very useful for the transmission of pitch, yaw and roll motion to a tool or implement member.

A number of robot joints are illustrated in the Vykukal U.S. Pat. No. 3,405,406 and the Vykukal et al U.S. Pat. No. 4,046,262. The Vykukal Patents describe hard-type space suits that permit the users inside the space suits to move around somewhat unrestricted.

The Bolner U.S. Pat. No. 3,912,172 describes a back-drivable, direct-drive hydraulically-actuated pitch and roll actuator.

The Rosheim U.S. Pat. Nos. 4,194,437 and 4,296,681, which were issued to the applicant of the present application, describe hydraulic servo mechanisms which impart rotary movements to a device to be driven.

The Stackhouse U.S. Pat. No. 4,068,536 describes a remotely-driven, mechanical manipulator. The manipulator is controlled by three concentric drive shafts which terminate in a spherically-shaped wrist mechanism.

The Totsuka U.S. Pat. No. 3,739,923 and the Niitu et al U.S. Pat. No. 3,784,031 describe a manipulator arm having two parallel rotating drive shafts in a beveled gear system which translates the drive shaft's rotating motion to a bending pitch motion and rotary roll motion in a tool member.

A mechanical wrist is described in German Patent 2,752,236 that includes three electric motors providing pitch, yaw and roll, which are mounted on the outside of a housing with the inside of the housing being hollow. The wrist is used for holding welding tongs and the hollow inside housing permits electrical power lines to be fed through the wrist.

The Molaug U.S. Pat. No. 4,107,948 describes a flexible robot arm that is composed of a number of mutually connected rigid links being connected at one end to a drive means and at the other end to a tool member.

Another robot arm is illustrated in the Wells U.S. Pat. No. 3,631,737. The robot arm of the Wells Patent includes a plurality of rigid tubular sections joined end-to-end by flexible joints to form an articulated arm. The rigid sections are manipulated by slender control cables which are attached to the respective sections and selectively extend and retract.

In addition, a number of well known universal joints are illustrated and described on pages 16 and 17 of the *Pictorial Handbook of Technical Devices* by Pete Grafstein and O. Schwarz, published by the Chemical Publishing Company, Inc. of New York, 1971. Although rotational motion can be transmitted through the universal joints illustrated on pages 16 and 17, the universal joints cannot be used in operations for transmitting pitch, yaw and roll motion to an implement or a tool member.

The development of robot arms and wrists is discussed in an article entitled, "Robot Wrist Actuators," *Robotics Age*, November/December 1982, pages 15–22 written by the applicant of the present invention. In this article, several characteristics are described which make robot wrists attractive. Disadvantages of prior art wrists are also discussed in the article.

SUMMARY OF THE INVENTION

The present invention includes an improved drive train for a robot wrist. The wrist includes a first and second gimbal assembly rotatably mounted within an interior of a support means. Each gimbal assembly has means for transferring motion to the other gimbal assembly to effect yaw and pitch motion. The wrist further includes decoupling means in slidable engagement with the support means for effecting movement of the wrist in a compound yaw/pitch motion. The improved drive train includes a yaw drive means having a gear surface and which is pivotally connected to the decoupling means. A drive shaft with a beveled gear end portion is arranged to engage the gear surface of the yaw drive means to impart yaw motion to the wrist. The drive train further includes a pitch drive means having a pitch gear surface and which is pivotally connected to the decoupling means. A drive shaft with a beveled gear end portion is arranged to engage the gear surface of the pitch drive means to impart pitch motion to the wrist. Means is also provided for rotational motion, said means for providing rotational motion being attached to the first gimbal assembly.

In another aspect of the present invention, the wrist includes a conduit useful for passing optical fibers or wirings therethrough, extending through each gimbal assembly. Each gimbal assembly includes an inner gimbal member rotatably mounted to the support means and includes means for transmitting motion to another inner gimbal member of the other gimbal assembly. Each gimbal assembly also includes an outer gimbal member rotatably mounted to the support means and having means for transmitting motion to the other outer gimbal member of the second gimbal assembly. The conduit means extends from the inner gimbal member through a slot of the outer gimbal member. The slot has oppositely facing first and second surfaces, each surface having first and second tracks. A first bearing means is disposed about the conduit and engages a first track of a first surface of the slot. A second bearing is also disposed about the conduit and engages a second track of a second surface of the slot.

In another aspect of the present invention, the robot wrist includes first and second gimbal assemblies rotatably mounted within a support means, with each assembly having means for transferring motion to the other gimbal assembly. Drive means are operatively connected to the support means for effecting selective movement of the first and second gimbal assemblies. Means are also included for transmitting rotational movement to the joint and includes a drive shaft extending from a base and attached to the first gimbal assembly. Means for stabilizing the wrist engages the drive shaft, said means including an arm member that is preloaded against the drive shaft and slidably engages the drive shaft and is pivotally attached to the support means.

In still a further aspect of the present invention, a linkage means is provided for stabilizing a wrist having first and second gimbal assemblies. The linkage means has a first end that is pivotally attached to a support means that supports the first and second gimbal assemblies and a second end that is pivotally attached to a base from which the drive means that effects selective movement of the first and second gimbal assemblies extends.

DETAILED DESCRIPTION OF THE PREFERRED EMBODIMENTS

Figure 1:
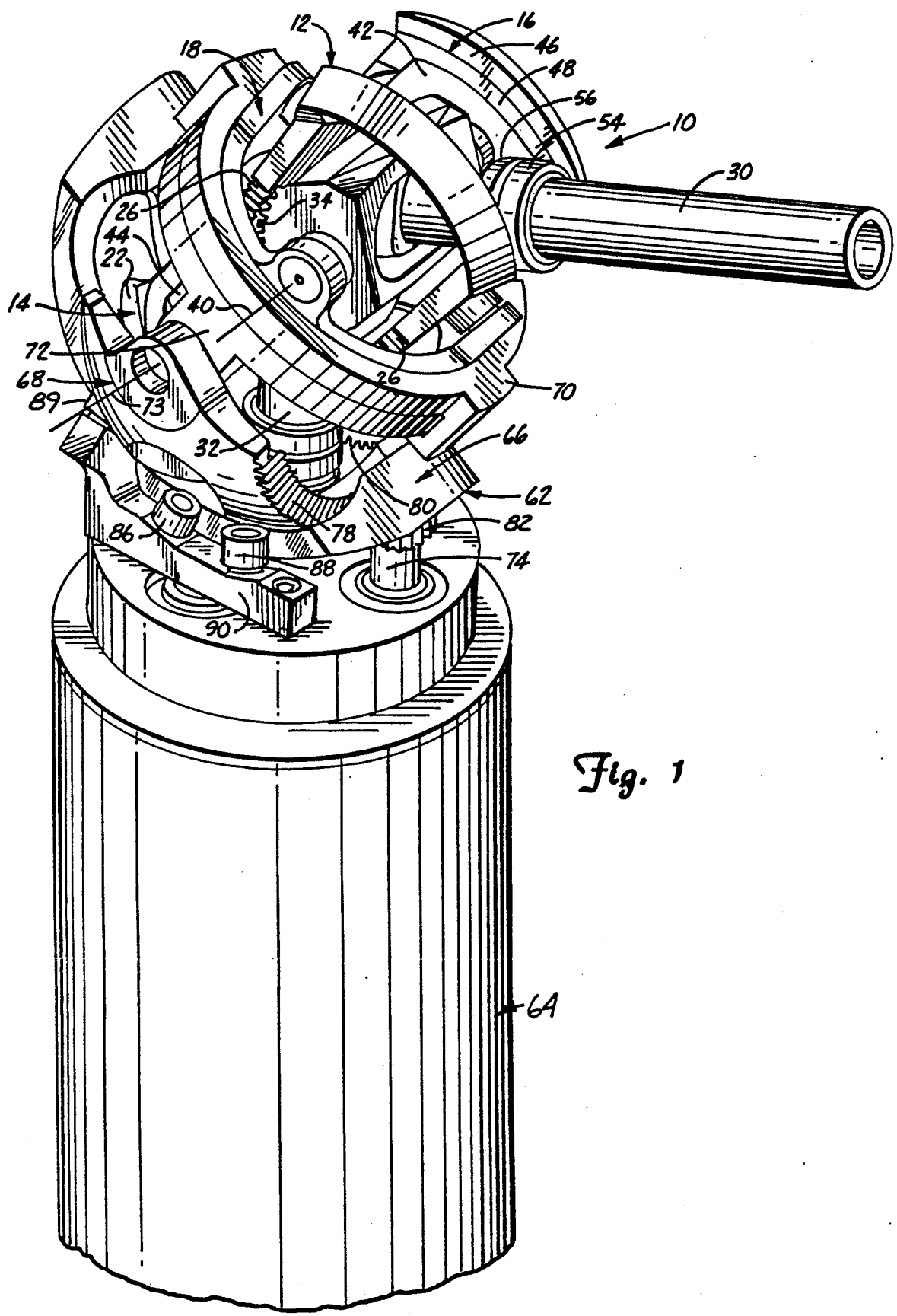
FIG. 1 is a perspective view of the wrist and drive train of the present invention.

The wrist of the present invention is generally indicated at 10 in FIG. 1. The wrist 10 is similar in general concept to the wrist described in the Rosheim U.S. Pat. No. 4,686,866, issued to the applicant of the present application. The present application is directed to improvements in the wrist and the drive train.

The wrist 10 includes an upper gimbal assembly 12 and a lower gimbal assembly 14. The reference to upper and lower gimbal assemblies is for purposes of convenience with respect to drawings and is not intended to limit the present invention in any way.

Figure 2:
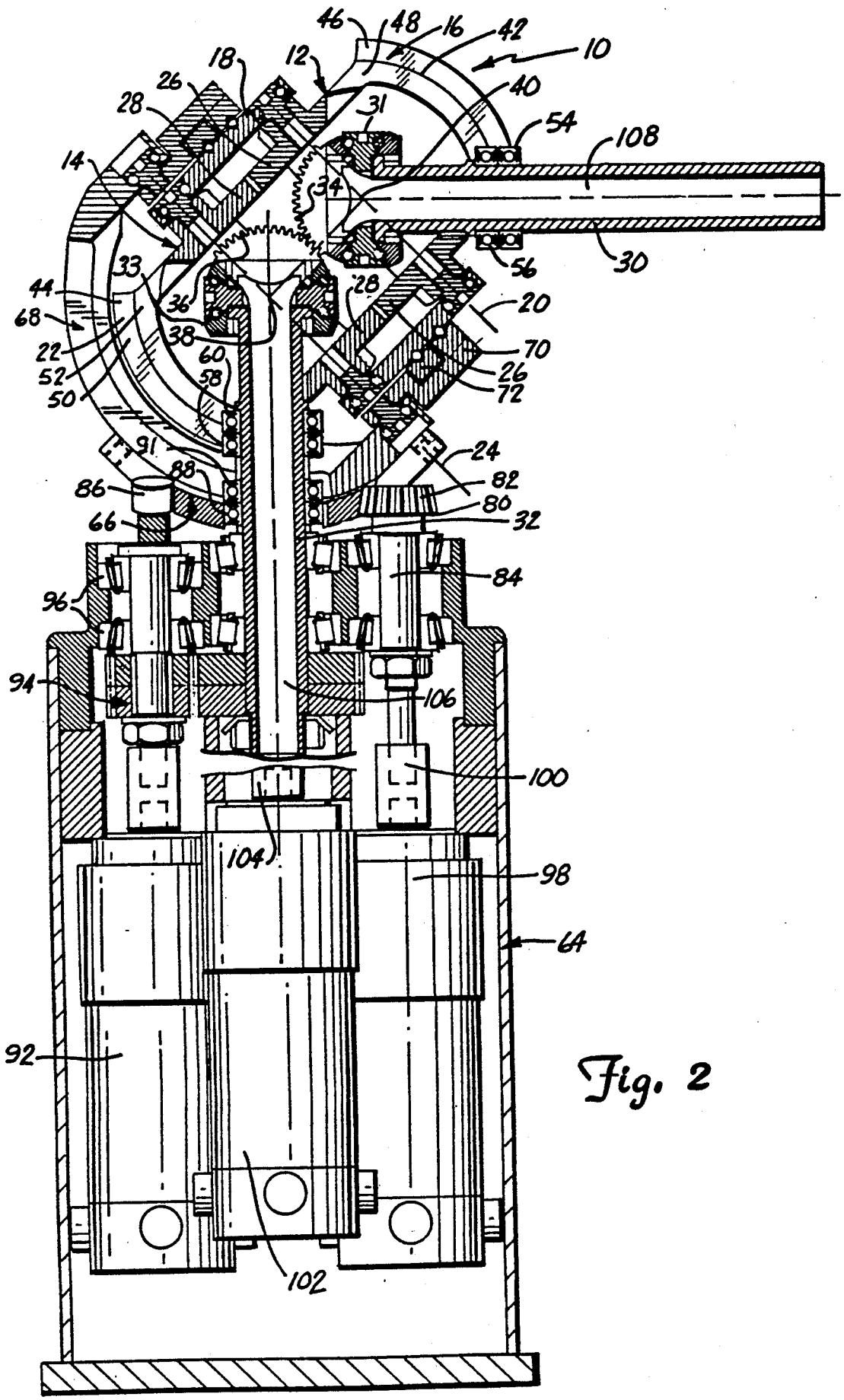
FIG. 2 is a sectional view of with some portions shown whole for purposes of clarity.

The upper gimbal assembly 12 includes an outer upper gimbal 16 rotatably attached to a housing 18 along a pivot axis 20, as best illustrated in FIG. 2. The lower gimbal assembly includes an outer lower gimbal 22 pivotally attached to the housing 18 about a pivot axis 24. The gimbal 16 includes a pair of spur gears 26. Similarly, the gimbal 22 includes a pair of spur gears 28 that are in cooperative engagement with the spur gears 26 such that motion is transmitted between the gimbals 16 and 22 through the spur gears 26 and 28. Movement of the outer gimbals causes "pitch" motion in the wrist 10. The gimbals 16 and 14 are pivotally attached to the housing structure 18.

To accomplish movement of the wrist in a direction essentially perpendicular to the axis 20 and 24 ("yaw" motion), the wrist includes upper and lower drive shafts 30 and 32 attached to inner gimbals 31 and 33, respectively. The upper inner gimbal 31 includes gears 34. Similarly, the lower inner gimbal 33 includes gears 36 that mate and cooperate with the gears 34 permitting pivoting of the wrist about axis 38 and the upper drive shaft about axis 40, as best illustrated in FIG. 2.

The outer gimbals 16 and 14 include slots 42 and 44 through which the drive shafts 30 and 32, respectively, extend. To facilitate movement within the slots 42 and 44, the slots each include first tracks 46 and 50, and second tracks 48 and 52. Although only one side surface of the gimbals is illustrated, it will be understood that a second oppositely-facing surface with like tracks exists. The tracks 46 and 48 are offset and the tracks 50 and 52 are offset. By offset is meant that one track extends toward the center of the slot more than the other. For example, as illustrated in FIG. 1, track 46 extends inwardly more than track 48. The tracks 50 and 52 are also offset in a manner similar to the tracks 46 and 48.

Bearings 54 and 56 are disposed about the shaft 30 to engage the tracks 46 and 48, respectively. The bearings 46 and 48 permit movement of the upper drive shaft 30 within the slot 42 with minimal backlash. Similarly, bearings 58 and 60 are disposed about the shaft 32 and engage the tracks 50 and 52, respectively, such that the drive shaft 32 travels through the slot 44 with minimal backlash.

As can best be seen in FIG. 2, the cooperation between the lower drive shaft 32 and the upper drive shaft 30 through the respective gear portions 34 and 36 provides movement (pitch movement) of the drive shaft 30 from a position that is coaxial to the drive shaft 32 to a position that is essentially perpendicular to the drive shaft 32 (or 90°). It will be understood that the drive shaft 30 is movable in exactly an opposite direction for 90° or a total of 180°. Movement in a direction perpendicular to the pitch movement (yaw movement) is caused by outer gimbals 16 and 14 through their respective spur gear portions. Yaw movement extends for a total of 180°. If both the inner and outer gimbals are actuated, a compound yaw/pitch motion results.

Motive force to the wrist 10 is provided by a drive mechanism generally indicated at 62 in FIG. 1. The drive mechanism 62 transfers motive force from a plurality of drive motors disposed within the housing 64 to the wrist 10. The driving mechanism 62 includes a yaw drive gimbal 66, a pitch drive gimbal 68 and the previously mentioned lower drive shaft 32. The gimbal 66 is pivotally attached along the axis 24 to a first decoupling member 70 in circumferential slidable engagement with the housing structure 18. In a similar fashion, the drive gimbal 68 is pivotally attached to a second decoupling member 72 about an axis 73 which is also in circumferential slidable engagement with the housing structure 18. It will be appreciated, that the decoupling member 70 and 72 also rotate circumferentially around the housing structure 18 with respect to each other such that decoupling of the wrist during compound yaw/pitch motion occurs. Both decoupling members 70 and 72 are in slidable engagement with the housing structure 18 through bearings.

Motive force is imparted to the drive gimbal 68 through rotating shaft 74 whose upper end portion includes gears 76 that engage a gear surface 78 of the gimbal 68 in an arcuate arrangement so that pivoting can occur about axis 73. The gear surface 78 extends along one side of the gimbal 68. Similarly, the drive gimbal 66 includes a gear surface 80 disposed along one side of the gimbal that is cooperatively engaged by gears 82 which comprise the end portion of a rotating drive shaft 84. The gimbal 66 is arcuately shaped with the gear surface arcuately arranged so that pivotal movement of the drive gimbal about axis 24 occurs.

To minimize backlash and facilitate precision movement, both drive gimbals 62 and 68 are preloaded. For example, the drive gimbal 66 is preloaded against idler rollers 86 and 88 which are mounted on the housing 64 through mounting bracket 90, as best illustrated in FIG. 1. As best illustrated in FIG. 2, a bearing 88 is positioned between the lower drive shaft 32 and the gimbal 66 in a slot of the gimbal 66.

Similarly, the drive gimbal 68 is preloaded against an idler roller 89 (illustrated in FIG. 1) that is mounted on the bracket 90 on a side of the gimbal 68 opposite from the gear surface 78. The gimbal 68 is preloaded against the idler roller 89 and a bearing 91 is disposed in a slot of the gimbal 68 between the drive shaft 30 and the gimbal 68.

An electric motor 92 is disposed within the housing 64 and provides motive force to the drive shaft 32 through a gear reduction assembly 94 to provide rotational motion to the wrist 10. The drive shaft of the motor 92 is held in aligned rotation through engagement of bearings 96 disposed on a side of the gear reduction assembly 96 opposite from the motor 92.

The shaft 84 is rotated by electric motor 98 which is directly connected to the shaft 84 through coupling 100. Similarly, rotational movement to the shaft 74 (which is illustrated in FIG. 1) is supplied by electric motor 102 (which is depicted in FIG. 2 as extending outwardly from the figure). The motor 102 is directly connected to the shaft 74 through coupling 104.

It will be appreciated that rotational movement of the shaft 84 is translated into yaw motion through the gimbal 66. Rotational movement of the shaft 74 is translated into pitch motion through the gimbal 68. Rotation of both shafts 74 and 84 will provide a compound pitch-yaw movement of the wrist of the present invention through decoupling action of the members 70 and 72 as described previously. Rotational movement is imparted to the wrist through rotation of the drive shaft 32 by motor 92.

The lower drive shaft 32 includes an inner passage 106 and the upper drive shaft 30 also includes an inner passage 108. The passages 106 and 108 are open at their gear end portions 36 and 34 and permit placement of wires, fiber optic lines, fluid or pneumatic lines for use at the distal end of the drive shaft 32.

Figure 3:
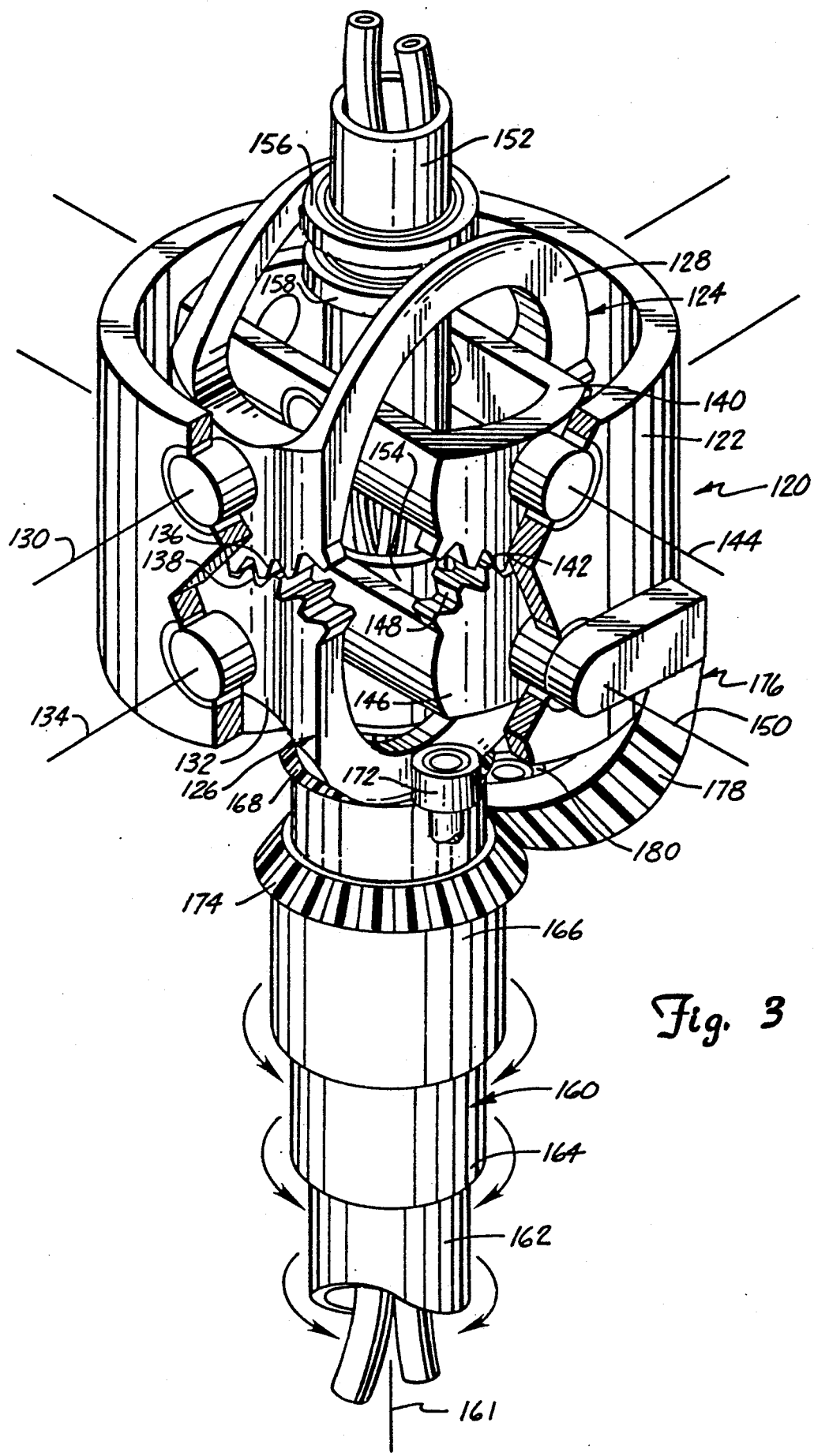
FIG. 3 is a perspective view of an alternative embodiment and alternative drive mechanism of the present invention.
Figure 5:
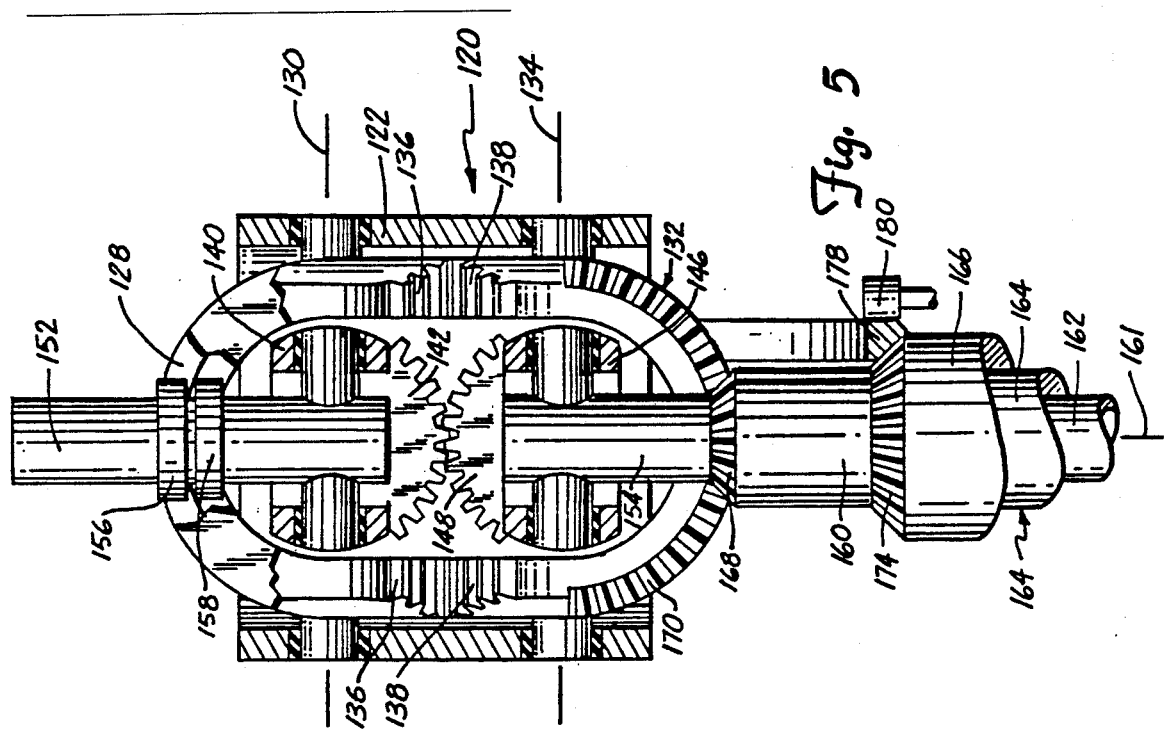
FIGS. 4 and 5 are sectional views of the wrist of FIG. 3.
Figure 4:
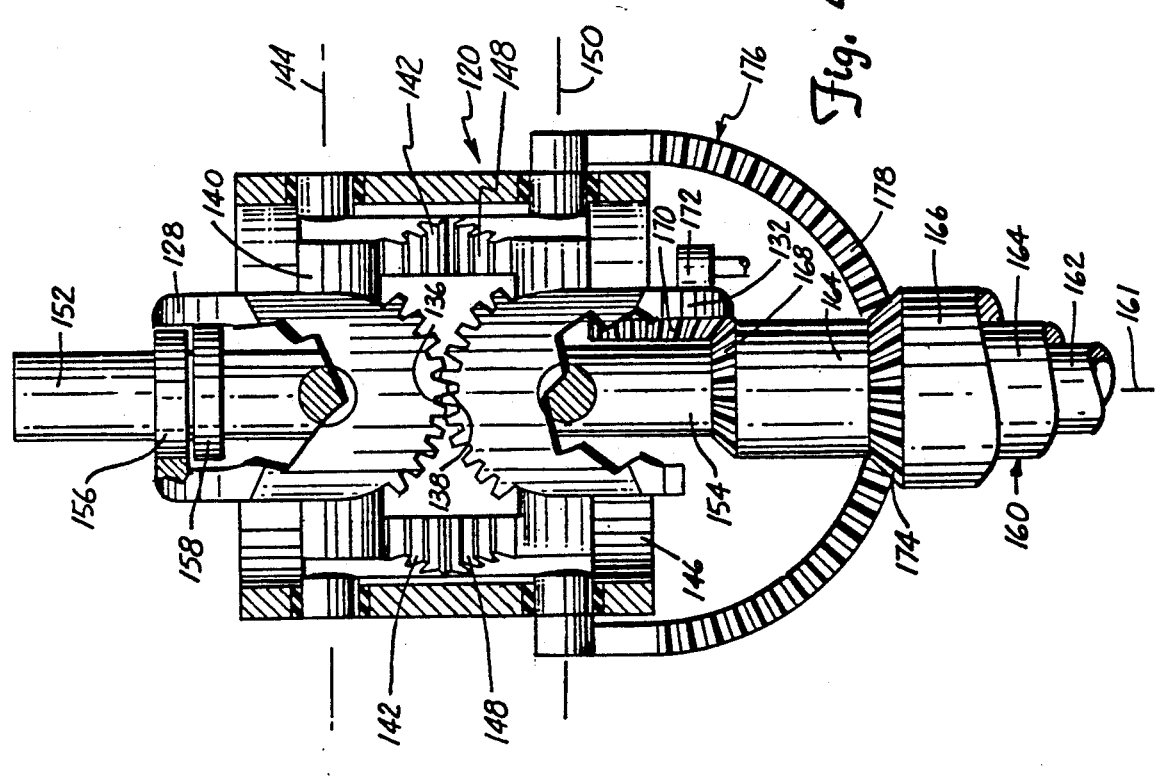

An alternative embodiment of the present invention is generally indicated at 120 in FIG. 3. The wrist 120 includes a housing 122 and a first gimbal assembly 124 and a second gimbal assembly 126. The first gimbal assembly includes an outer gimbal 128 that is pivotally attached to the housing 122 about axis 130. Similarly, the gimbal assembly 126 includes an outer gimbal 132 pivotally attached to the housing 123 about an axis 134 that extends substantially parallel to the axis 130. The gimbals 128 and 126 include spur gear sections 136 and 138, respectively, that cooperatively engage each other to transmit movement between the gimbals 128 and 134, as best illustrated in FIG. 5. The gimbal assembly 124 further includes an inner gimbal 140 having spur gear sections 132 disposed on opposite ends thereof, as best illustrated in FIG. 4. The inner gimbal 140 is pivotally attached to the housing 122 about axis 144. Similarly, the gimbal assembly 126 includes an inner gimbal 146 having spur gear portions 138 positioned on opposite ends of the gimbal 146, and pivotally attached to the housing 122 along axis 150. The axis 150 is substantially parallel to the axis 144.

Each of the gimbals, 140, 128, 146 and 132 includes slots or openings through which conduits 152 and 154 extend. As best illustrated in FIGS. 4 and 5, the conduit 152 extends through the gimbals 128 and 140 and is pivotally attached to the gimbal 140. Similarly, the conduit 154 extends through the gimbals 132 and 146 and is pivotally attached to the gimbal 146, as best illustrated in FIG. 5. The conduits 152 and 154 are used to facilitate electrical wiring, fiber optic cables, fluid or pneumatic lines, to a distal end of the conduit 152.

To facilitate movement of the conduit 152 with respect to the gimbal 128, bearings 156 and 158 are provided around the conduit 152. As best illustrated in FIG. 4, the bearing 156 is preloaded against one surface of the slot of the gimbal 128 while the bearing 158 is preloaded on an oppositely facing surface of the slot of the gimbal 128.

To provide motive force to the wrist 120, a coaxially disposed unique drive train 160 is provided. The drive train 160 includes rotational drive shaft 162, pitch drive shaft 164 and yaw drive shaft 166. The drive shafts 162, 164 and 166 are disposed coaxially with respect to each other. The pitch drive shaft is disposed within the yaw drive shaft 166 and extends outwardly therefrom through a distal end. Similarly, the rotational drive shaft 162 is disposed within the pitch drive shaft and is preferably the same member as the conduit 154. The drive shaft 162 (conduit 154) extends out of a distal end of the pitch drive shaft 164. Each of the drive shafts are suitably connected to an electric motor (not shown) in a manner that is well known.

To impart rotational movement to the wrist of the present invention, the drive shaft 162 (conduit 154) is rotated about the axis 161 and the entire wrist is rotated.

To impart pitch movement, the pitch drive shaft 164 includes bevel gear portion 168. The gimbal 132 includes a cooperating bevel gear 170 that cooperates with the gear portion 168. An idler roller 172 preloads the gear 170 against the gear portion 168. Rotational movement of the shaft 164 is translated into pivotal movement of the gimbal 146 about the axis 150.

The yaw drive shaft 166 also includes a bevel gear portion 174. A bevel gear yaw drive member 176 is pivotally attached to the housing 122 along the axis 150. The drive member 176 includes a bevel gear portion 178 that cooperatively engages the bevel gear 174 of the shaft 166. An idler roller 180 provides a force to preload the gear portion 178 in cooperative engagement with the gear portion 174. It will be appreciated that rotational movement of the shaft 166 is transmitted into pivotal movement of the housing along the axis 150.

Figure 6:
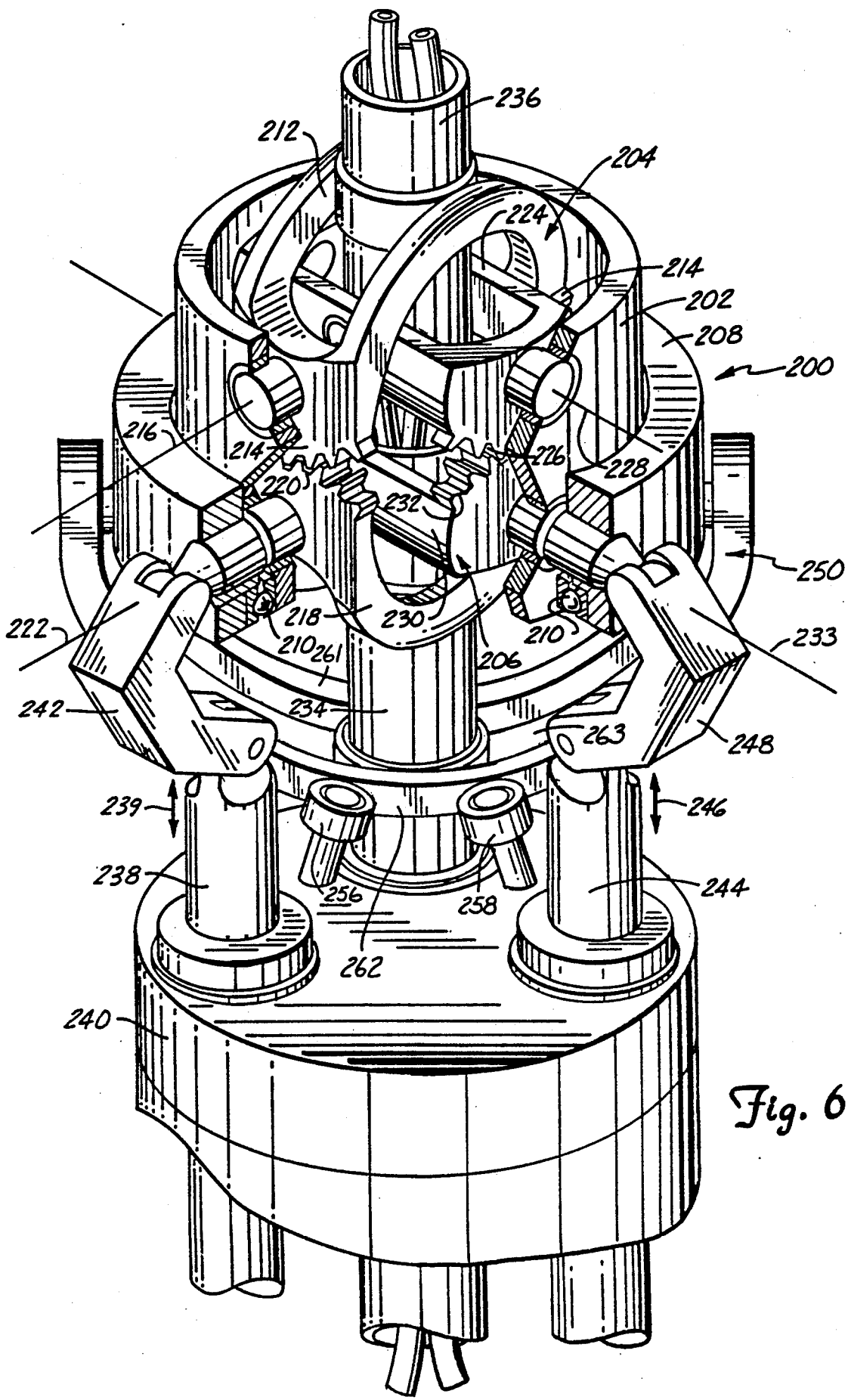
FIG. 6 is a perspective view of another embodiment showing the mechanism to stabilize the wrist using the central rotational drive shaft.
Figure 7:
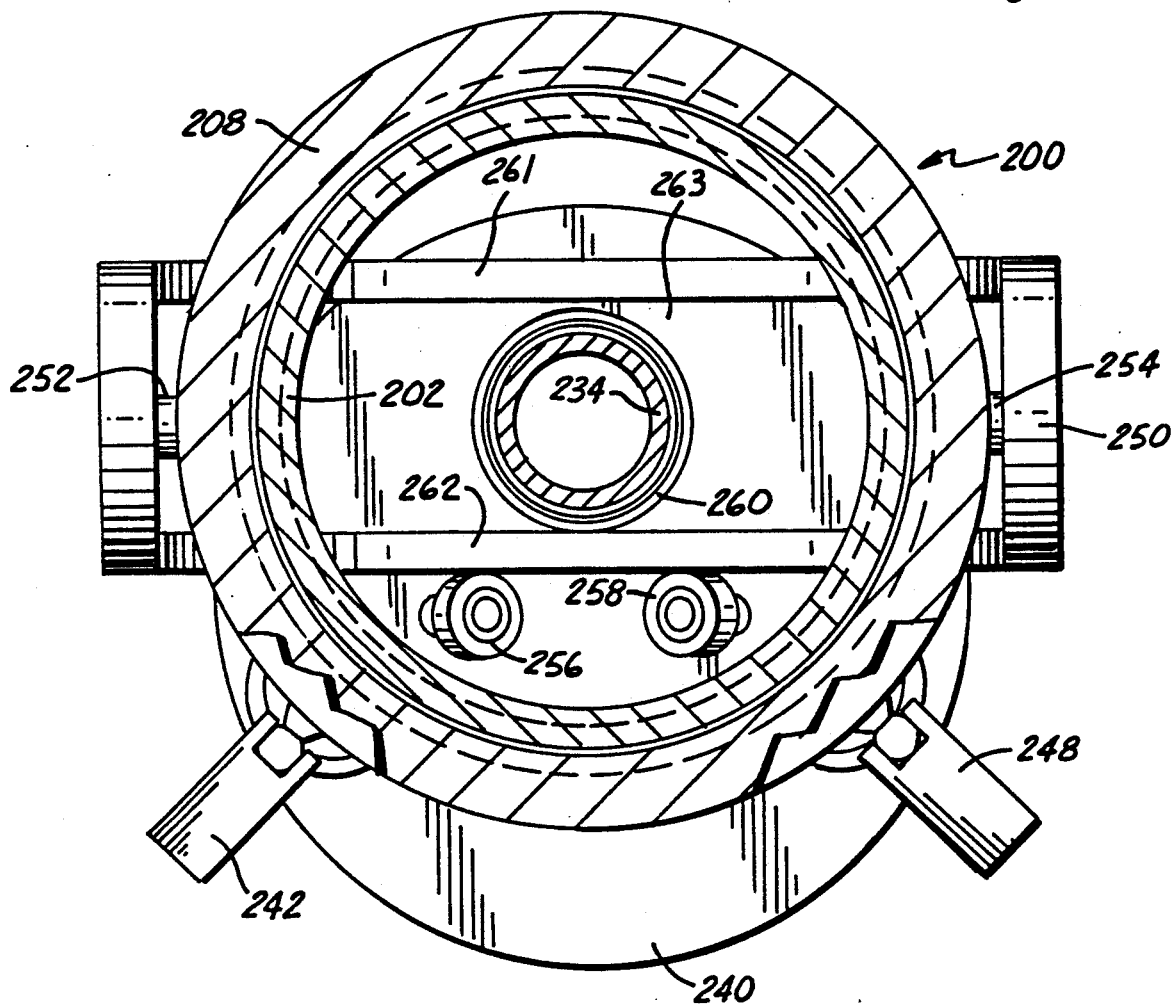
FIG. 7 is a sectional view perpendicular to the axis of the wrist of FIG. 6.

An alternative embodiment of the wrist of FIGS. 3–5 is generally indicated at 200 in FIGS. 6–7. In most respects, the embodiment 200 is similar to the wrist illustrated in FIGS. 3–5 except for the drive train, and a mechanism for minimizing backlash during movement of the wrist.

The wrist 200 includes a housing 202, a first gimbal assembly 204 and a second gimbal assembly 206. The housing 202 is rotatably secured within a collar 208 through bearings 210 that are circumferentially disposed between the collar 208 and the housing 202. The gimbal assembly 204 includes an outer gimbal 212 having spur gear end portions 214 and pivotally attached to the housing 202 along an axis 216.

Similarly, the gimbal assembly 206 has an outer gimbal 218 having spur gear end portions 220 and pivotally attached to the housing 202 along axis 222. The axis 222 is substantially parallel to the axis 216.

The gimbal assembly 204 also has inner gimbal 224 with spur gear end portions 226 and is pivotally attached to the housing 202 along axis 228. Similarly, the gimbal assembly 206 has inner gimbal 230 with spur gear portion 232 in cooperative engagement with the spur gear portion 226 and is pivotally attached to the housing 202 along an axis 233.

A drive shaft 234 for providing rotational motive force to the wrist 200 extends through the gimbal 218 and is attached to the gimbal 230 in a manner similar to the one described with reference to the embodiment of FIGS. 3–5. A conduit 236 is attached to the gimbal 224 and extends therethrough and through the gimbal 212 in a manner also similar to the embodiment of FIGS. 3–5. Electrical wires, fiber optic cables, fluid or pneumatic lines may be disposed within the passage of the drive shaft 234 and the passage of the conduit 236 to a tool member (not shown) located at a distal end of the conduit 236.

Push-pull rod 238 extending from a housing 240 provides motive force for yaw rotation of the wrist 200 through link 242. The link 242 is pivotally attached at one end to the push-pull rod 238 and at another end to the collar 208.

A push-pull rod 244 extends through the housing 240 and travels along the general direction indicated by arrow 246 and is connected to the collar 208 by link 248. The link 248 is pivotally attached to the rod 244 at one end and pivotally attached to the collar at another end.

To stabilize the wrist and decrease possible backlash, the wrist is provided with a guidance gimbal 250 having a pair of arms 261 and 262 defining a slot 263. The gimbal 250 is pivotally attached to the collar 208 by pivot pins 252 and 254. As best illustrated in FIG. 7, the guidance gimbal 250 is preloaded against the drive shaft 234 by idler rollers 256 and 258. A bearing 260 is interposed between the drive shaft 234 and the arm 262 of the gimbal 250. It will be appreciated, as the wrist 200 is actuated, that the arm 262 of the gimbal 262 will travel between the idler rollers 256 and 258 and the bearing 260.

Figure 8:
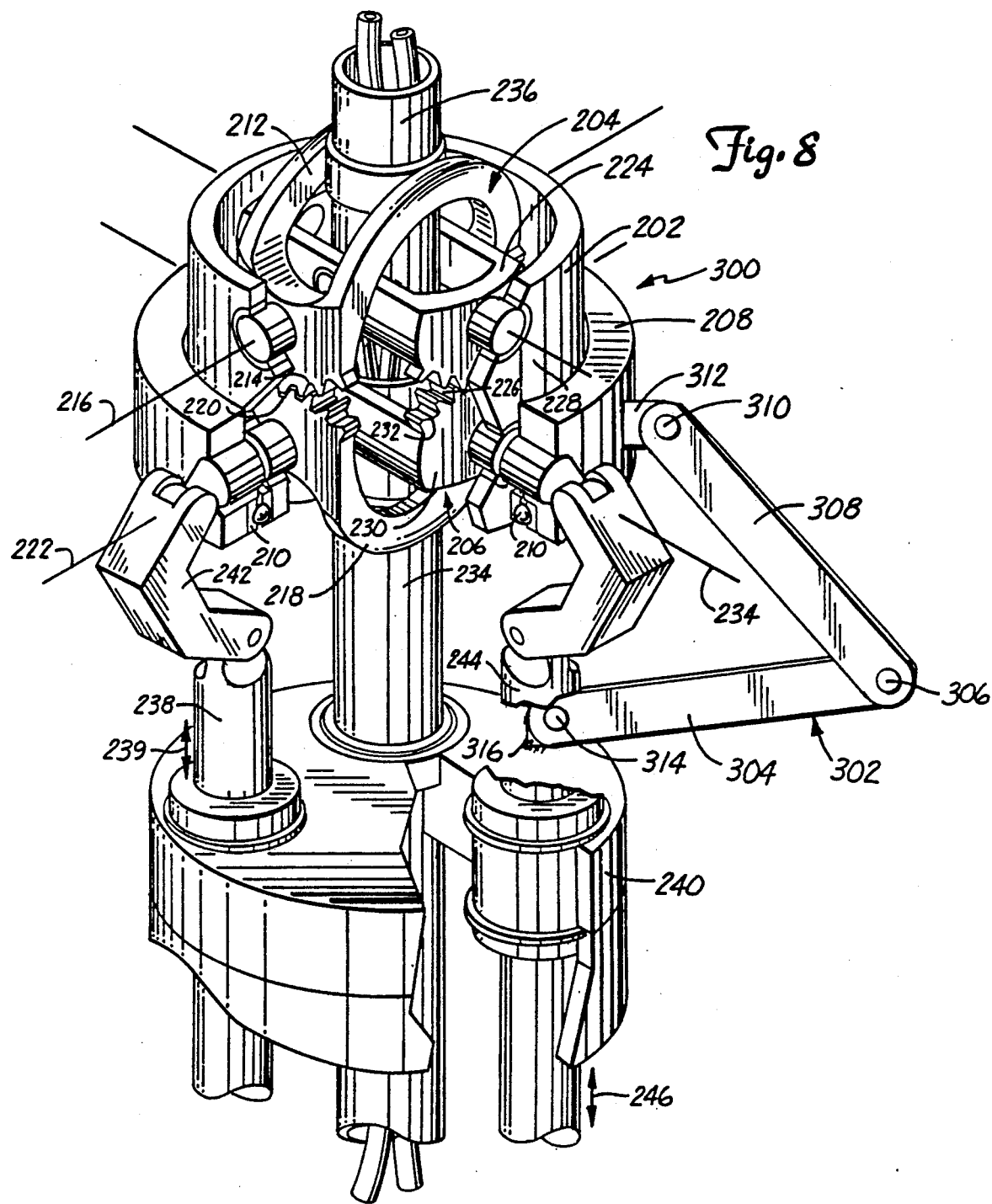
FIG. 8 is a perspective view of another embodiment of a mechanism to stabilize the wrist using a scissors linkage.

An alternative method of stabilizing the wrist 300 is illustrated in FIG. 8. Since many of the elements of the wrist of FIG. 8 are the same as the elements of the wrist of FIGS. 6 and 7, like reference characters will be used to indicate like elements.

A scissors linkage 302 includes a lower link 304 pivotally attached through a pin 306 to an upper link 308. The upper link 308 is pivotally attached to the collar 208 by pivot pin 310 engaging a tab member 312 that is fixedly attached to the collar 208. The bottom link 304 is pivotally attached to the housing 240 through pivot pin 314 pivotally attaching the link 304 to tab 316, which is fixedly attached to the housing.

Although the present invention has been described with reference to preferred embodiments, workers skilled in the art will recognize that changes may be made in form and detail without departing from the spirit and scope of the invention.

What is claimed is:

1. A mechanical joint comprising:
   support means having an interior;
   first and second gimbal means rotatably mounted within the interior, each gimbal means having means for transferring motion to the other gimbal means so that yaw and pitch motion is effected;
   decoupling means in slidable engagement with the support means for effecting movement of the joint in a compound yaw and pitch motion;
   yaw drive means having a yaw gear surface and pivotally connected to the decoupling means;
   a yaw drive shaft with a yaw gear end portion arranged to engage the gear surface of the yaw drive means;
   pitch drive means having a pitch gear surface and pivotally connected to the decoupling means;
   a pitch drive shaft with a pitch gear end portion arranged to engage the gear surface of the pitch drive means; and
   means for providing rotational motion connected to the first gimbal means.

2. The joint of claim 1 wherein the decoupling means includes a first and a second decoupling ring in rotational relationship with each other and the support means, the yaw drive means being pivotally attached to the first decoupling ring and the pitch drive means being pivotally attached to the second decoupling ring.

3. The joint of claim 1 wherein the yaw drive shaft, the pitch drive shaft and the means for providing rotational motion are coaxially disposed with respect to one another.

4. The joint of claim 1 and further including:
   means for stabilizing movement of the yaw drive means; and
   wherein the yaw drive means is disposed between the means for stabilizing movement and the yaw drive shaft.

5. The joint of claim 4 wherein the means for stabilizing movement includes roller means engaging a surface of the yaw drive means.

6. The joint of claim 1 and further including:
   means for stabilizing movement of the pitch drive means; and
   wherein the pitch drive means is disposed between the means for stabilizing movement and the pitch drive shaft.

7. The joint of claim 6 wherein the means for stabilizing movement includes roller means engaging a surface of the pitch drive means.

8. The joint of claim 1 wherein the first gimbal means includes:
   an inner gimbal member rotatably mounted to the support means and having means for transmitting motion to another inner gimbal member of the second gimbal means;
   an outer gimbal member rotatably mounted to the support means and having means for transmitting motion to another outer gimbal of the second gimbal means;
   conduit means having an internal passage and being attached to the inner gimbal member and extending through a slot of the outer gimbal member, the slot having oppositely-facing first and second surfaces, each surface having first and second tracks;
   first bearing means disposed about the conduit means and engaging a first track of a first surface; and
   second bearing means disposed about the conduit means and engaging a second track of a second surface.

9. A mechanical joint comprising:
   support means having an interior;
   a first and a second gimbal assembly rotatably mounted within the interior, each gimbal assembly having means for transferring motion to the other gimbal assembly;
   drive means operatively connected to the first and second gimbal assemblies for effecting selective movement of the first and second gimbal assemblies;

means for transmitting rotational movement to the joint including a drive shaft attached to the first gimbal assembly; and means for engaging the drive shaft having a member that is preloaded against and slidably engaging the drive shaft and being pivotally attached to the support means.

10. A mechanical joint comprising:

support means having an interior;

a first and second gimbal assembly rotatably mounted within the interior, each gimbal assembly having means for transferring motion to the other gimbal assembly;

drive means operatively connected to the first and second gimbal assemblies for effecting selective movement of the first and second gimbal assemblies;

means for transmitting rotational movement to the joint; and linkage means for stabilizing the joint having a first end pivotally attached to the support means and a second end pivotally attached to a base from which the drive means extends.

* * * * *